United States Patent
Oh et al.

(10) Patent No.: US 7,154,892 B2
(45) Date of Patent: Dec. 26, 2006

(54) METHOD AND APPARATUS FOR MANAGING LPM-BASED CAM LOOK-UP TABLE, AND RECORDING MEDIUM THEREFOR

(75) Inventors: Sang Yoon Oh, Daejeon (KR); Bong Wan Kim, Seoul (KR); Bin Yeong Yoon, Daejeon (KR); Lee Heyung Sub, Daejeon (KR); Lee Hyeong Ho, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 945 days.

(21) Appl. No.: 10/136,959

(22) Filed: May 2, 2002

(65) Prior Publication Data
US 2003/0103498 A1 Jun. 5, 2003

(30) Foreign Application Priority Data
Nov. 30, 2001 (KR) .............................. 2001-75275

(51) Int. Cl.
*H04L 12/28* (2006.01)
(52) U.S. Cl. .................. 370/392; 370/381; 711/108; 711/200
(58) Field of Classification Search .............. None
See application file for complete search history.

(56) References Cited

U.S. PATENT DOCUMENTS

| 6,118,760 | A | 9/2000 | Zaumen et al. | |
|---|---|---|---|---|
| 6,237,061 | B1* | 5/2001 | Srinivasan et al. | 711/108 |
| 6,944,168 | B1* | 9/2005 | Paatela et al. | 370/401 |
| 2003/0028713 | A1* | 2/2003 | Khanna et al. | 711/108 |

* cited by examiner

*Primary Examiner*—Duc Ho
(74) *Attorney, Agent, or Firm*—Blakely Sokoloff Taylor & Zafman

(57) ABSTRACT

A method for managing a content addressable memory (CAM) look-up table using the longest prefix matching (LPM) is provided. The method includes providing a pair of pointers per every band of data having the same prefix in length, wherein one of the pair of pointers stores the address of data having the lowest address in each band of data, and the other pointer of the pair of pointers stores the next higher address of data having the highest address in each band of data; and making a space in which data is to be added in the CAM look-up table by moving data having the addresses stored in the pair of pointers provided per each band of data that has a shorter prefix length than the prefix length of the data to be added, when data is added to the CAM look-up table. According to the method, it is possible to easily and efficiently add new data into the look-up table of the CAM.

8 Claims, 6 Drawing Sheets

METHOD AND APPARATUS FOR MANAGING LPM-BASED CAM LOOK-UP TABLE, AND RECORDING MEDIUM THEREFOR

BACKGROUND OF THE INVENTION

1. Field of the Invention

The present invention relates to a method for managing a content addressable memory (CAM) look-up table using the longest prefix matching (LPM), and more particularly, to a method for adding data to the CAM look-up table using LPM, the apparatus therefor and recording medium therefor.

2. Description of the Related Art

FIG. 1 is a block diagram of a forwarding engine 110 for routing by a conventional router. The forwarding engine 110 extracts a destination address from an incoming IP packet 100. Then, a next hop determination unit 120 finds out a next hop (not shown) for the destination address of the IP packet 100, referring to information regarding the next hop stored in a forwarding table 130, and then transmits the IP packet 100 to the next hop.

Here, the longest prefix that matches the destination address of the incoming packet is generally searched to find the next hop using the destination address of the IP packet 100. There are a lot of methods for realizing the longest prefix matching (LPM).

The LPM can be searched using a tree, which is a modified binary tree, as shown in FIG. 2. Here, nodes 210 through 240 are nodes corresponding to 0* prefix of a forwarding table, 10* prefix, 111* prefix and 11010* prefix, respectively. However, with such a tree structure of FIG. 2, it does not take uniform time to search the LPM using a destination address of an IP packet. In other words, the LPM can be directly searched when a prefix that matches destination address is 1-bit long. However, when a prefix that matches a destination address is n-bit long, the LPM is searched by comparing the prefixes n times.

To solve such a problem, a method for searching the LPM using a specific memory such as a content addressable memory (CAM) has been suggested. When data containing destination addresses is input to the CAM, a destination address matching the LPM is output. If there are at least two addresses matching the LPM, the CAM outputs the lower address out of these addresses. FIG. 3 is a view of a forwarding table 300 in which prefix and next hop data is stored. For instance, if a destination address included in a packet is "103.23.122.7", a next hop stored in the lowest address among addresses having the same prefix length, which are stored in the forwarding table 300, is extracted, i.e., 107.3.2.22.

Therefore, there is a need to store data in a look-up table of the CAM, which is a forwarding table, from the lowest address in the longest prefix length order. Also, it is required an easy and efficient method of adding new data into the look-up table of the CAM.

SUMMARY OF THE INVENTION

To solve the above problems, it is a first objective of the present invention to provide a method for managing a look-up table of a content addressable memory (CAM) that is based on the longest prefix matching (LPM) easily and efficiently.

It is a second objective of the present invention to provide an apparatus for managing a look-up table of an LPM-based CAM.

It is a third objective of the present invention to provide a recording medium in which such a method can be implemented.

To achieve an aspect of the first objective, there is provided a method for managing a content addressable memory (CAM) look-up table using the longest prefix matching (LPM), including the steps of: providing a pair of pointers per every band of data having the same prefix in length, wherein one of the pair of pointers stores the address of data having the lowest address in each band of data, and the other pointer of the pair of pointers stores the next higher address of data having the highest address in each band of data; and making a space in which data is to be added in the CAM look-up table by moving data having the addresses stored in the pair of pointers provided per each band of data that has a shorter prefix length than the prefix length of the data to be added, when data is added to the CAM look-up table.

To achieve another aspect of the first objective, there is provided a method for managing a CAM look-up table using LPM wherein data having the longest prefix length is stored at the lowest address, including the steps of: providing a pair of pointers per every band of data having the same prefix length, wherein one of the pair of pointers is a lower pointer which stores the address of data having the lowest address in each band of data, and the other pointer of the pair of pointers is an upper pointer which stores the next higher address of data having the highest address in each band of data; and writing data having an address stored in the lower pointer provided per each band of data, which has a shorter prefix length than the prefix length of the data to be added, to the address stored in the upper pointer provided per each band of data, and writing the data to be added to the address stored in the upper pointer provided in the band of data having the same prefix length as the data to be added, in the case that data is added to the look-up table.

To achieve still another aspect of the first objective, there is provided method for adding data to a CAM look-up table using LPM wherein data having the longest prefix length is stored at the lowest address, including the steps of: providing a pair of pointers per every band of data having the same prefix in length, wherein one of the pair of pointers is a lower pointer which stores the address of data having the lowest address in each band of data, and the other pointer of the pair of pointers is an upper pointer which stores the next higher address of data having the highest address in each band of data; receiving a command of adding data to the look-up table; writing data having an address stored in the lower pointer provided per each band of data, which has a shorter prefix length than the prefix length of the data to be added, to the address stored in the upper pointer provided per said each band of data in order to make a space in which data is to be added in the CAM look-up table; and writing the data, which is to be added, at the address stored in the upper pointer provided in the band of data having the same prefix length as the data to be added.

To achieve the second objective, there is provided an apparatus for managing a CAM look-up table using the LPM including: a CAM including a look-up table in which data having the longest prefix is stored at the lowest address; a pointer storage unit including a pair of pointers per every band of data having the same prefix in length, wherein one of the pair of pointers is a lower pointer which stores the address of data having the lowest address in each band of data, and the other pointer of the pair of pointers is an upper pointer which stores the next higher address of data having the highest address in each band of data; and a table managing unit for writing data having an address stored in the lower pointer provided per each band of data, which has a shorter prefix length than the prefix length of the data to be added, to the address stored in the upper pointer provided per said each band of data, writing the data to be added, at the address stored in the upper pointer provided at the band of data having the same prefix length as the data to be added, and updating the addresses stored in the lower pointers and the upper pointers included in the pointer storage unit, in the case that data is added to the look-up table.

Preferably, when updating the addresses stored in the lower pointer and the upper pointer included in the pointer storage unit, the table managing unit updates the addresses stored in the lower pointer and the upper pointer provided per each band of data, which has a shorter prefix length than the length of the prefix of the data to be added, so that the lower pointer and the upper pointer provided per said each band of data may store the next higher addresses, and updating the address stored in the upper pointer provided to the band of data which has the same prefix length as the prefix length of the data to be added, so that the upper pointer provided per said band of data may store the next higher address.

Preferably, the upper and lower pointers are implemented as registers.

To achieve the third objective, there is provided a recording medium for recording a program that can implement a method for managing a look-up table of an LPM-based CAM in a computer.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Figure 1:
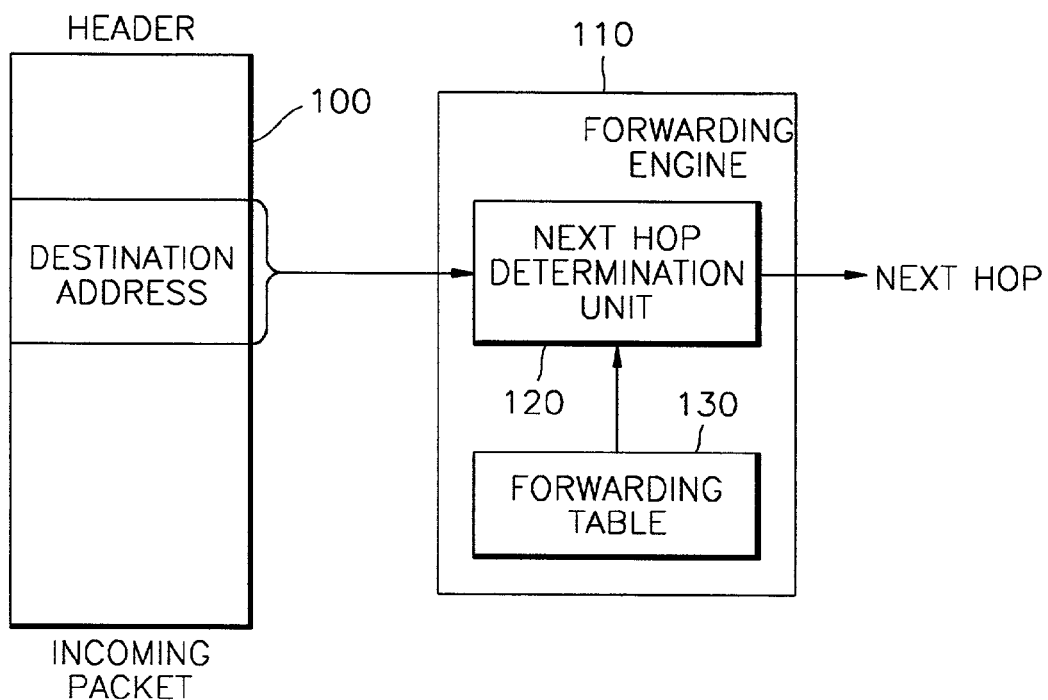
FIG. 1 is a schematic view of the structure of a forwarding engine installed in a conventional router.
Figure 2:
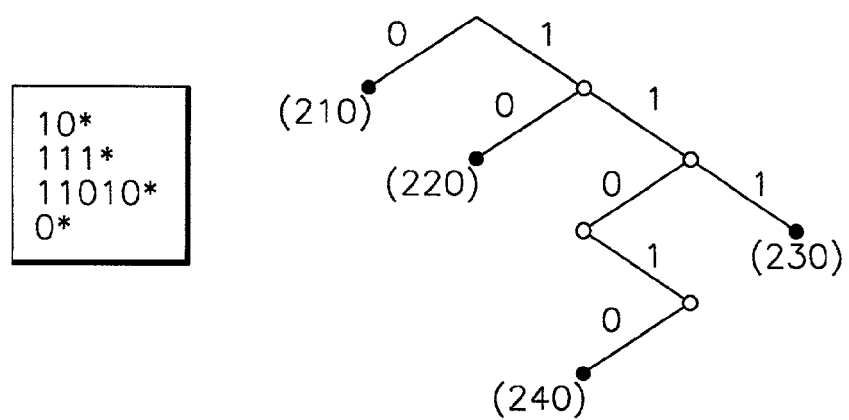
FIG. 2 is a conventional binary tree of the longest prefix matching (LPM)
Figure 3:
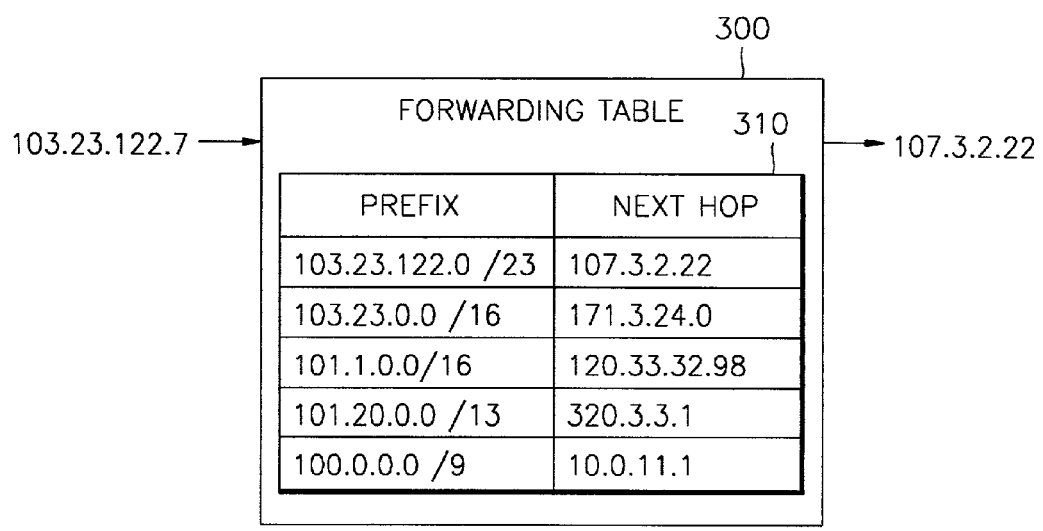
FIG. 3 is a view of a forwarding table adopting a content addressable memory (CAM) to search the LPM.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art. The same reference numerals in different drawings represent the same elements, and thus their description will be omitted.

Figure 4:
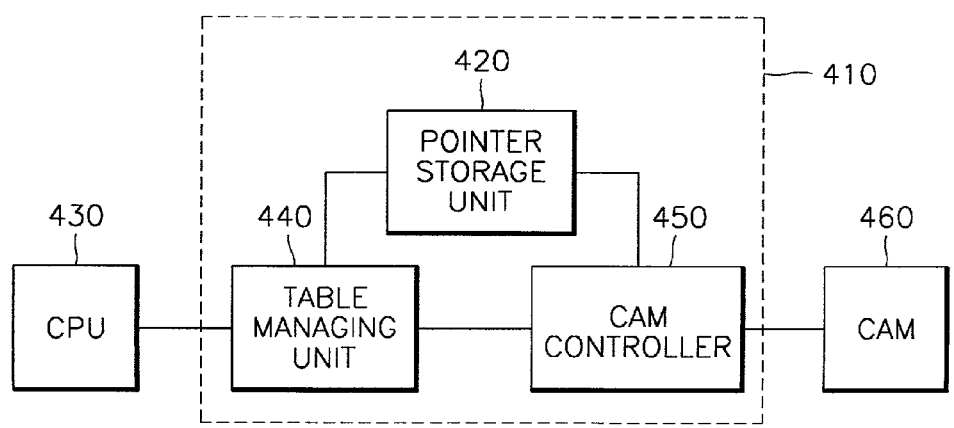
FIG. 4 is a block diagram of an apparatus for managing a forwarding table according to the present invention.

FIG. 4 is an apparatus 410 for managing a forwarding table according to a preferred embodiment of the present invention. The apparatus 410 comprises a pointer storage unit 420, a table managing unit 440 and a CAM (content addressable memory) controller 450. A central processing unit (CPU) 430 and a CAM 460 are connected to the apparatus 410, respectively.

The table managing unit 440 has an interface with the CPU 430, and controls the pointer storage unit 420 and the CAM controller 450. That is, the table managing unit 440 receives a command for adding data to a forwarding table (not shown) of the CAM 460, drives the CAM controller 450 to update data stored in a look-up table stored in the CAM 460, and further, updates pointers stored in the pointer storage unit 420.

The CAM controller 450 has an interface with the pointer storage unit 420 and the table managing unit 440, and controls the CAM 460 to update data stored in the look-up table of the CAM 460. In detail, the CAM controller 450 receives a control command from the table managing unit 440, and drives the CAM 460 to detect or read data stored in the CAM 460, or write data to the CAM 460.

The pointer storage unit 420 includes pointers that store addresses of data stored in the look-up table (hereinafter, "CAM table") stored in the CAM 460. The pointer storage unit 420 contains a total of n pointers in a range from a pair of an upper pointer UP(0) and a lower pointer LP(0) whose prefixes are 0 in length, to a pair of an upper pointer UP(n/2−1) and an lower pointer LP(n/2−1) whose prefixes are n/2−1 in length (n is an even integer). Among n pointers, the lower pointer indicates data having the lowest address out of data having the same prefix length, and the upper pointer indicates data having the next higher address to the highest address out of data having the same prefix length. That is, the lower pointer stores the address of data having the lowest address out of data having the same prefix length, and the upper pointer stores the address of data having the next higher address to the highest address out of data having the same prefix length. The upper pointers and lower pointers included in the pointer storage unit 420 can be implemented with registers.

Figure 5:
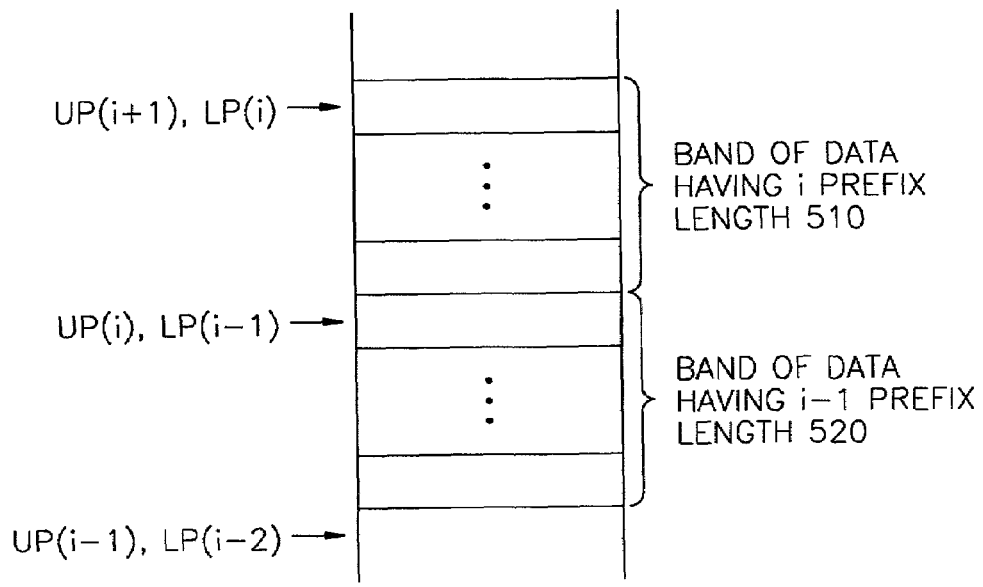
FIG. 5 is a view for explaining a forwarding table according to the present invention.

FIG. 5 is a view for explaining the concept of a forwarding table according to the present invention. In FIG. 5, reference numeral '510' denotes a band of data having the prefix length of i in which data having the prefix length of i is stored disorderly, reference numeral '520' denotes a band of data having the prefix length of i−1, in which data having the prefix length of i−1 is stored disorderly. For this reason, data having the lowest address in the band of data can be moved to the next higher address to the highest address in the band of data when new data is added to the forwarding table.

Among the addresses of data stored in the band of data 510 having the prefix length of i, data of the lowest address is indicated by the lower pointer LP(i), and data of the next higher address to the highest address is indicated by the upper pointer UP(i). Thus, LP(i−1), which is the lower pointer of the band of data having the prefix length of i−1, indicates the same data as UP(i), and UP(i+1), which is the upper pointer of the band of data having the prefix length of i+1, indicates the same data as LP(i). Here, that a pointer indicates data must be understood that the pointer stores the address of data.

Figure 6:
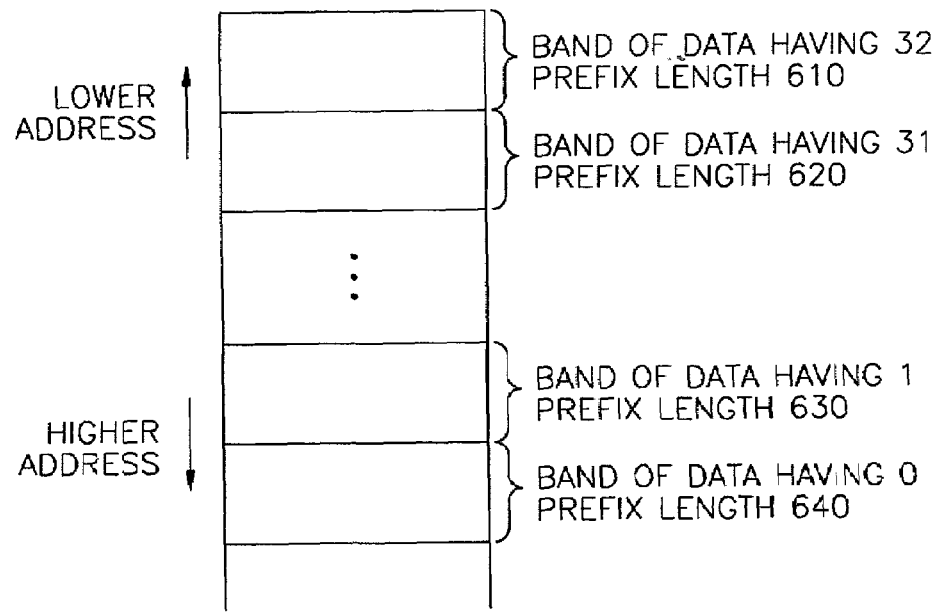
FIG. 6 is a view for explaining a forwarding table according to the present invention when the longest prefix is 32-bit sequence.

FIG. 6 is a view of an example of the band of data when n/2−1 is 32, and all bands of data are present. A band of data having 0 prefix in length is default data, and used in the case that there is no matching prefix.

As shown in FIG. 5, upper pointers and lower pointers are provided per each band of data having the same prefix in length in a CAM table. When data having prefix of a predetermined length is added, data indicated by lower pointers of the each band is moved to the address space of data indicated by upper pointers of the each band out of the bands of data, which has a shorter prefix length than the prefix length of data to be added. For this reason, it is possible to vacate a space where additional data is stored. For instance, if data to be added to the CAM table of FIG. 5 has the prefix length of i, data indicated by the LP(0) is read and stored in a space in which data indicated by the UP(0) is stored (i is an integer). Then, data indicated by the LP(1) is read and stored in a space where data indicated by the UP(1). Such a process is repeated, data indicated by the LP(i−1) is read and stored in a space where data indicated by the UP(i−1) is stored, and finally, data to be added is stored in a space where the UP(i) is stored, thus completing updating data stored in the CAM table. Accordingly, it is possible to add new data to the CAM table by updating only data indicated by upper pointers, among the bands of data having the same prefix in length. That is, there is no need to update data existing between data indicated by lower pointers and upper pointers, and thus, new data can be easily and rapidly added.

Also, it is possible to conveniently manage pointers by updating the addresses stored in the pointers indicating data region in which data is updated. For example, assuming that there are bands of data having prefix of every length, the movement of data is made two times when data having the prefix length of 2 is to be added. Thereafter, it is possible to add new data to an unoccupied space, i.e., data region indicated by the UP(2), and the addresses of data indicated by five pointers such as the UP(0), the LP(0), the UP(1), the LP(1) and the UP(2) is updated with the next higher addresses respectively.

Figure 7:
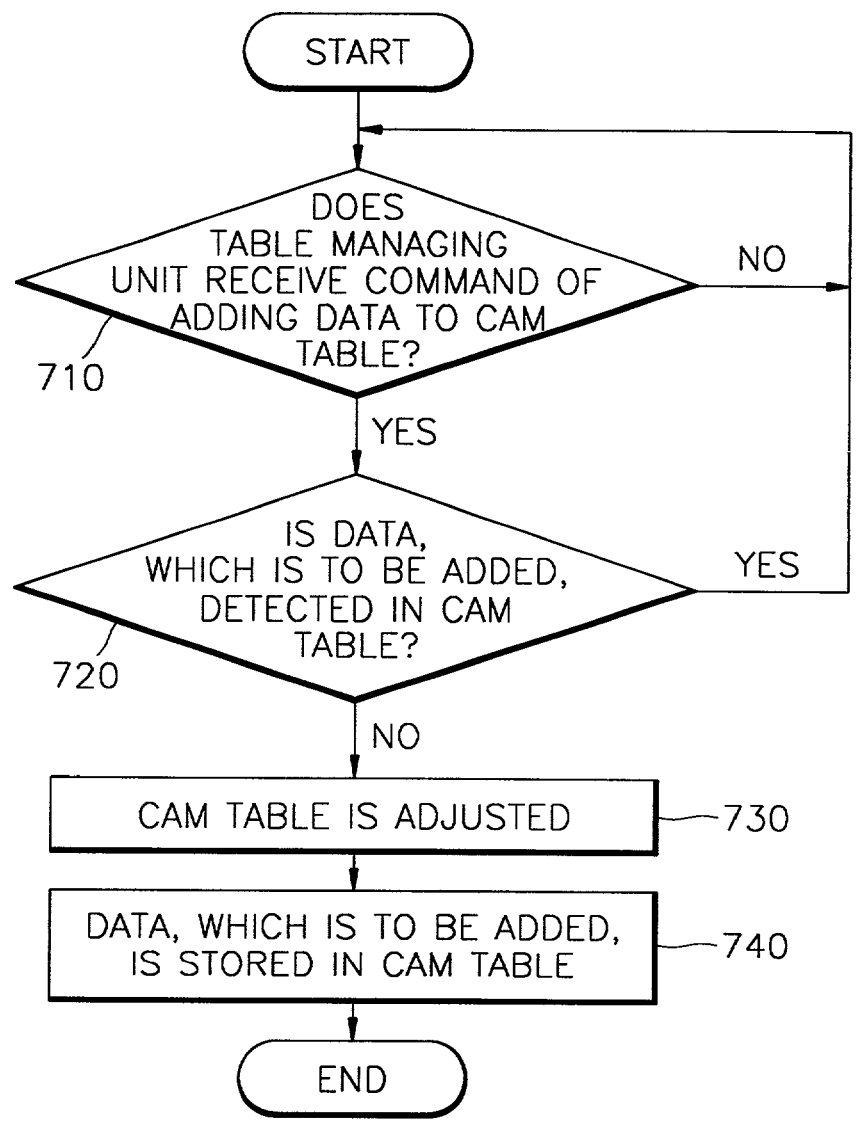
FIG. 7 is a flowchart of a method of adding data into a forwarding table of a CAM according to the present invention.

Hereinafter, a method for adding data to a CAM table included in the CAM 460, according to the present invention, will now be described with reference to FIGS. 4 and 7. First, the table managing unit 440 receives a command for adding data to the CAM table from the CPU 430 (step 710). Then, the table managing unit 440 sends a command for searching data to the CAM controller 450, and then, the CAM controller 450 searches if the relevant data exists in a look-up table of the CAM 460, which is the CAM table (step 720). As a result of search, if the relevant data doesn't exist in the CAM table, the table managing unit 440 drives the CAM controller 450 to adjust the CAM table (step 730).

Thereafter, the table managing unit 440 updates the addresses stored in pointers, included in the pointer storage unit 420, and then, makes the CAM controller 450 to write data to be added in the CAM table (step 740).

Figure 8:
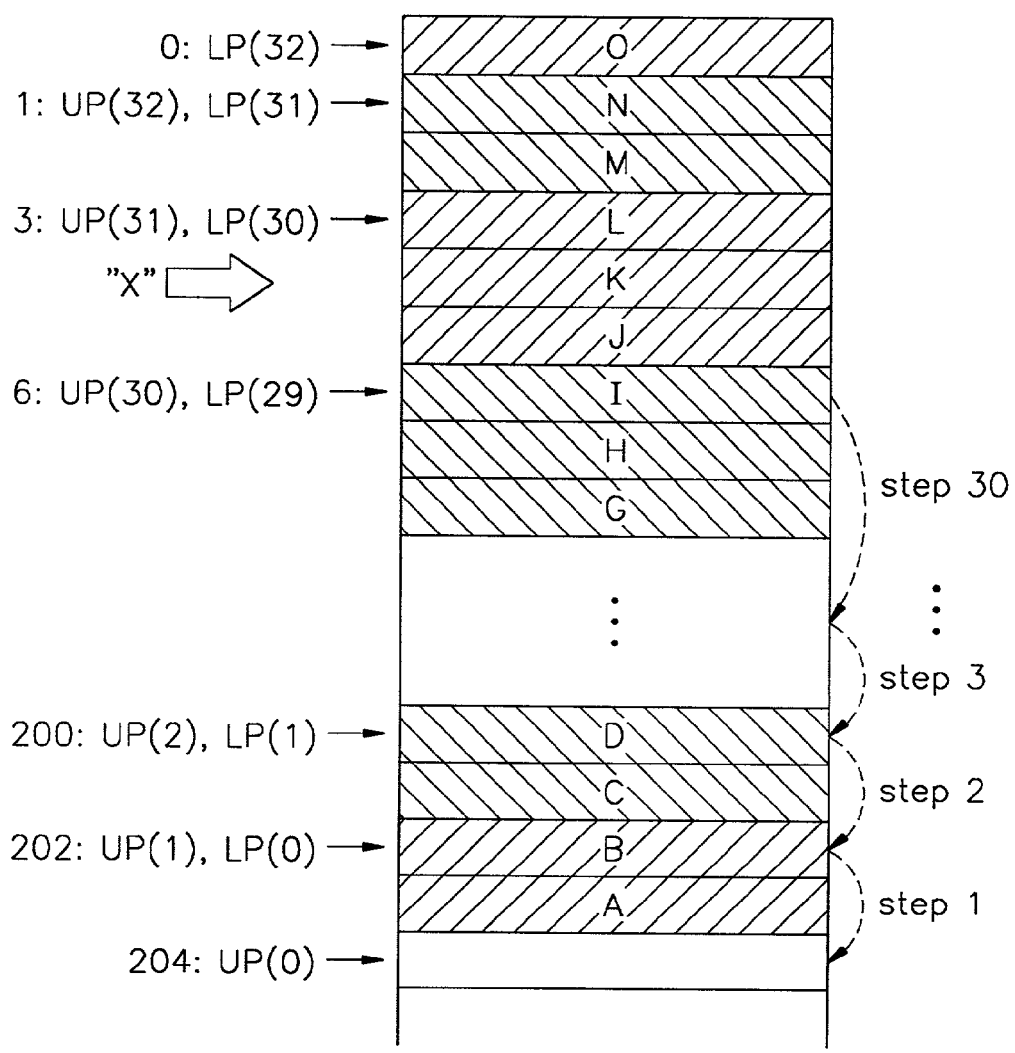
FIG. 8 is a view of the structure of a forwarding table in which data is not added for explaining a method of adding data into a forwarding table of a CAM using the forwarding table of FIG. 6.
Figure 9:
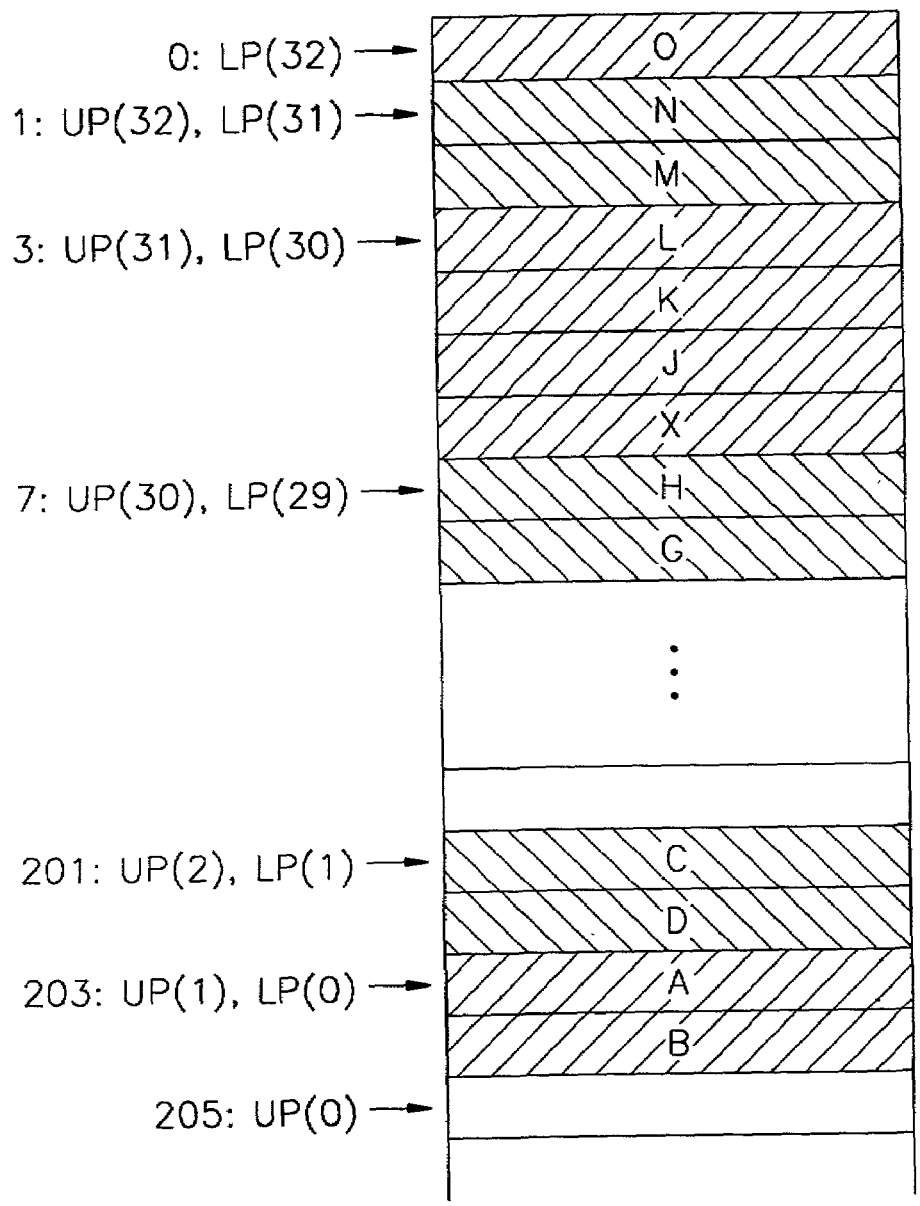
FIG. 9 is a view of the structure of a forwarding table in which data has been added for explaining a method of adding data into a forwarding table of a CAM using the forwarding table of FIG. 6.

Referring to FIGS. 8 and 9, a method for adding data to a CAM table, according to a preferred embodiment of the present invention, will now be described in detail.

It is assumed that each band of CAM table has at least one data and CAM table has data band from the band of data having the prefix length of 0 to the band of data having the prefix length of 32, data A and data B are stored in the band of data having the prefix length of 0; data C and data D are stored in the band of data having the prefix length of 1; data I, data H and data G are stored in the band of data having the prefix length of 29; data L, data K and data J are stored in the band of data having the prefix length of 30; data N and data M are stored in the band of data having the prefix length of 31; and data O is stored in the band of data having the prefix length of 32. Also, it is assumed that an LP(32) indicates address 0, a UP(32) and an LP(31) indicate address 1, a UP(31) and LP(30) indicate address 3, a UP(30) and an LP(29) indicate address 6, a UP(2) and LP(1) indicate address 200, a UP(1) and LP(0) indicate address 202, and a UP(0) indicate address 204.

When data X having the prefix length of 30 is added to the CAM table, the band of data having the prefix length of 0 is present at a highest address of the CAM table, and therefore, data indicated by LP(0) is moved to the UP(0) (step 1). That is, data B indicated by the LP(0) is read and written to the address 204 indicated by the UP(0). As a result, data A and B, which has the prefix length of 0, become stored in addresses 203 and 204. Therefore, the address stored in the UP(0) is updated to be address 205, and the address stored in the LP(0) is updated to be address 203.

After carrying out the step 1, address 202, which is a data region data indicated by the UP(1) is stored, becomes vacant. Thus, data D indicated by the LP(1) can be read and written to address 202, which is a data region indicated by the UP(1) (step 2). Also, as in the step 1, data C and D having the prefix length of 1 are filled in addresses 201 and 202. Thus, the address stored in the UP(1) is updated to be address 203, and the address stored in the LP(1) is updated to be address 201.

As a result of the step 2, address 200, which is a data region indicated by the UP(2), is vacant. Then, data indicated by the LP(2) is read and written to address 200, which is a data region indicated by the UP(2) (step 3). Such a process is continued until data indicated by the LP(29) is read and written to a data region indicated by the UP(29) (step 30).

That is, data I indicated by the LP(29) is read and written to a data region indicated by the UP(29). Then, the address stored in the UP(29) is updated with the next higher address, and the address stored in the LP(29) is updated to be address 7. As a result of the step 30, address 6, which is a data region indicated by the UP(30) is vacant. Finally, new data X is written to address 6, which is a data region indicated by the UP(30), thus completing updating data in the CAM table. Also, updating pointers is completed by updating the UP(30), which is the upper pointer of the band of data having the prefix length of 30, to be address 7 of a next address. FIG. 9 is a view of the structure of the CAM table in which updating data has been completed by a method described with reference to FIG. 8.

The movement of data occurs in data I . . . D, and B, which having addresses indicated by the LPs and UPs, among the each band of data, whereas no movement of data occurs in data A, C, . . . G, H, J, K, L, M, N and O. Also, after the addition of data, the UP(0) must indicate data of the higher address next to the highest address of the band of data having the prefix length of 0. Thus, address is increased by one, i.e., to address 205. Therefore, the addresses indicated by the other pointers are updated with higher addresses, respectively.

However, at this time, the address indicated by the lower pointer of the band of data, which has the same prefix length as the prefix length of data to be added, is not updated with a higher address, i.e., the address of the LP(30) indicating data L in FIG. 9.

As described above, in the present invention, it is described that data is moved per each band of data, the lower and upper pointers are updated, and the next data is moved, and so on. However, pointers can be updated in block after completing the movement of all data.

A method of managing a look-up table of a CAM can be implemented as a computer readable code in a recording medium operated by a computer. Such a recording medium refers to every kind of recording devices which operate in a computer and in which data is stored, e.g., ROMs, RAMs, CD-ROMs, magnetic tapes, floppy disks, optical data storage devices, and carrier waves that transmits data through the Internet. These recording media can be distributively installed in a computer system connected to networks.

As described above, the respective band of data having the same prefix includes an upper pointer and a lower pointer. When data is added to a CAM table, only data indicated by upper and lower pointers of the respective band of data is moved to vacate a data region in which data is to be added. Therefore, it is easily and rapidly update data contained in the look-up table of the CAM.

What is claimed is:

1. A method for managing a CAM (content addressable memory) look-up table using LPM (Longest Prefix Matching), the method comprising:

providing a pair of pointers per every band of data having the same prefix in length, wherein one of the pair of pointers stores the address of data having the lowest address in each band of data, and the other pointer of the pair of pointers stores the next higher address of data having the highest address in each band of data; and making a space in which data is to be added in the CAM look-up table by moving data having the addresses stored in the pair of pointers provided per each band of data that has a shorter prefix length than the prefix length of the data to be added, when data is added to the CAM look-up table.

2. A method for managing a CAM look-up table using LPM wherein data having the longest prefix length is stored at the lowest address, the method comprising:

providing a pair of pointers per every band of data having the same prefix length, wherein one of the pair of pointers is a lower pointer which stores the address of data having the lowest address in each band of data, and the other pointer of the pair of pointers is an upper pointer which stores the next higher address of data having the highest address in each band of data; and writing data having an address stored in the lower pointer provided per each band of data, which has a shorter prefix length than the prefix length of the data to be added, to the address stored in the upper pointer provided per each band of data, and writing the data to be added at the address stored in the upper pointer provided in the band of data having the same prefix length as the data to be added, in the case that data is added to the look-up table.

3. The method of claim 2 further comprising:

updating the addresses stored in the lower pointer and the upper pointer provided per each band of data which has a shorter prefix length than the prefix length of the data to be added so that the lower pointer and the upper pointer provided per each band of data may store the next higher addresses, and updating the addresses stored in the upper pointer provided per each band of data which has the same prefix length as the prefix length of the data to be added so that the upper pointer provided per said each band of data may store the next higher address.

4. A method for adding data to a CAM look-up table using LPM wherein data having the longest prefix length is stored at the lowest address, the method comprising:

providing a pair of pointers per every band of data having the same prefix in length, wherein one of the pair of pointers is a lower pointer which stores the address of data having the lowest address in each band of data, and the other pointer of the pair of pointers is an upper pointer which stores the next higher address of data having the highest address in each band of data;

receiving a command of adding data to the look-up table;

writing data having an address stored in the lower pointer provided per each band of data, which has a shorter prefix length than the prefix length of the data to be added, to the address stored in the upper pointer provided per said each band of data in order to make a space in which data is to be added in the CAM look-up table; and writing the data, which is to be added, at the address stored in the upper pointer provided in the band of data having the same prefix length as the data to be added.

5. A computer-readable recording medium having a computer program recorded that implements the method of any one of claims 1 through 4 in a computer.

6. An apparatus for managing a CAM look-up table using the LPM, the apparatus comprising:

a CAM including a look-up table in which data having the longest prefix is stored at the lowest address;

a pointer storage unit including a pair of pointers per every band of data having the same prefix in length, wherein one of the pair of pointers is a lower pointer which stores the address of data having the lowest address in each band of data, and the other pointer of the pair of pointers is an upper pointer which stores the next higher address of data having the highest address in each band of data; and a table managing unit for writing data having an address stored in the lower pointer provided per each band of data, which has a shorter prefix length than the prefix length of the data to be added, to the address stored in the upper pointer provided per each band of data, writing the data to be added, at the address stored in the upper pointer provided at the band of data having the same prefix length as the data to be added, and updating the addresses stored in the lower pointers and the upper pointers included in the pointer storage unit, in the case that data is added to the look-up table.

7. The apparatus of claim 6, wherein when updating the addresses stored in the lower pointer and the upper pointer included in the pointer storage unit, the table managing unit updates the addresses stored in the lower pointer and the upper pointer provided per each band of data, which has a shorter prefix length than the length of the prefix of the data to be added, so that the lower pointer and the upper pointer provided per said each band of data may store the next higher addresses, and updating the address stored in the upper pointer provided to the band of data which has the same prefix length as the prefix length of the data to be added, so that the upper pointer provided per said band of data may store the next higher address.

8. The apparatus of claim 6, wherein the upper and lower pointers are implemented as registers.

* * * * *